(12) United States Patent
Gao (10) Patent No.: US 11,694,046 B2
(45) Date of Patent: Jul. 4, 2023

(54) MICROCONTROLLER-BASED CODE READER AND RELATED METHOD AND DEVICE

(71) Applicant: Datalogic USA Inc., Eugene, OR (US)

(72) Inventor: WenLiang Gao, Eugene, OR (US)

(73) Assignee: Datalogic USA Inc., Eugene, OR (US)

( * ) Notice: Subject to any disclaimer, the term of this patent is extended or adjusted under 35 U.S.C. 154(b) by 0 days.

(21) Appl. No.: 16/521,502

(22) Filed: Jul. 24, 2019

(65) Prior Publication Data

US 2021/0027030 A1   Jan. 28, 2021

(51) Int. Cl.
*G06K 7/10* (2006.01)
*G06K 7/14* (2006.01)

(52) U.S. Cl.
CPC ....... *G06K 7/10821* (2013.01); *G06K 7/1469* (2013.01); *G06K 7/1486* (2013.01)

(58) Field of Classification Search
CPC .................................................. G06K 7/10821
USPC .................................................... 235/462.01
See application file for complete search history.

(56) References Cited

U.S. PATENT DOCUMENTS

| | | | |
|---|---|---|---|
| 4,492,450 A | 1/1985 | Watanabe et al. | |
| 5,319,181 A * | 6/1994 | Shellhammer | G06K 7/0166 235/462.09 |
| 5,473,148 A | 12/1995 | Tanaka et al. | |
| 6,290,131 B1 | 9/2001 | Kolis et al. | |
| 6,550,680 B1 | 4/2003 | Kolis et al. | |
| 6,642,956 B1 | 11/2003 | Safai | |
| 8,302,868 B2 | 11/2012 | Samek et al. | |
| 9,111,159 B2 | 8/2015 | Liu et al. | |
| 9,135,483 B2 | 9/2015 | Liu et al. | |
| 9,210,294 B2 | 12/2015 | Longacre, Jr. et al. | |
| 9,465,970 B2 | 10/2016 | Wang et al. | |
| 9,959,442 B2 | 5/2018 | Gao | |
| 2003/0080948 A1* | 5/2003 | Lapstun | H04N 1/00244 345/173 |
| 2013/0113967 A1 | 5/2013 | Wang | |
| 2015/0161427 A1* | 6/2015 | Guo | G06K 7/1443 235/462.08 |

FOREIGN PATENT DOCUMENTS

| | | |
|---|---|---|
| CN | 203502971 U | 3/2014 |
| CN | 104933456 A | 9/2015 |
| CN | 104566532 B | 1/2018 |

(Continued)

OTHER PUBLICATIONS

E. H. Adelson et al., "Pyramid Methods in Image Processing," RCA Engineer 29-6 Nov./Dec. 1984, pp. 33-41.

(Continued)

*Primary Examiner* — Rafferty D Kelly
(74) *Attorney, Agent, or Firm* — Foley & Lardner LLP (57) ABSTRACT

A microcontroller-based code reader and method of reading a machine-readable indicia may include capturing, by an imager, an image of a machine-readable indicia disposed an object. An image subsample of an image captured by the imager may be read from the imager. The image subsample or partial image data may be stored in an embedded memory of a microcontroller in electrical communication with the imager. The machine-readable indicia may be decoded from the image subsample.

20 Claims, 6 Drawing Sheets

(56) References Cited

FOREIGN PATENT DOCUMENTS

EP          2590400 A2    5/2013
KR     19990074607 A    10/1999

OTHER PUBLICATIONS

Kari Pulli, "Camera Processing Pipeline," 78 pages.
Koon, John, Key Factors to Consider When Choosing a Microcontroller, Apr. 29, 2019, 2 pgs.
Kun-Shan Lin, et al., The TMS320 Family of Digital Signal Processors, Proceedings of the IEEE, vol. 75, No. 9, Sep. 1987, 17 pgs.
Kun-Shan Lin, et al., The TMS320 Family of Digital Signal Processors, Texas Instruments, Application Report: SPRA396, 1997, 23 pgs.

* cited by examiner

MICROCONTROLLER-BASED CODE READER AND RELATED METHOD AND DEVICE

BACKGROUND

Code readers that read machine-readable indicia (e.g., barcodes, QR codes, watermarks. etc.) have become pervasive in many different areas of society. Code readers have been widely used in retail stores and logistics operations for many years, but have more recently become widely used in consumer applications (e.g., smartphones). As the Internet of things (IoT) has been developing, a wide variety of Internet-connected devices, such as home appliances, have been developed. As Internet-connected or IoT-enabled devices have evolved, more functions and features have been conceived and developed for such devices. For example, IoT-enabled refrigerators may include code readers to enable a user to scan a machine-readable indicia on food and other consumer packages. The IoT-enabled refrigerator may be configured to store information related to the associated scanned food (e.g., product name, identifier, quantity remaining in the refrigerator) and/or other items and to enable the user to order the items from a delivery service, for example, via a user interface on the IoT-enabled refrigerator. Other appliances, such as IoT-enabled microwaves and ovens, may allow for a user to scan a machine-readable indicia of a food item to cause the microwave or oven to use coded information or to look-up cooking instructions in an online database and to automatically set the cooking time and power level to proper settings for cooking the food item.

As with most home appliances, manufacturers are limited in production costs by affordability for consumers and competition for comparable products. Moreover, sizes of home appliances are limited such that minimal dimensions for every component within the home appliances are necessitated. As such, electronic and other components within the appliances have limited size constraints.

More particularly, code readers are typically formed of an image sensor or imager, microprocessing unit (MPU), and data storage memory. The imager is typically 640×480 pixels or larger as those size imagers are most widely available and relatively high dense barcode and bigger scan volume for user convenience. As a result of the imager size, the data captured by the imager is read by the MPU and written into the memory for processing thereafter by the MPU. Because embedded memories on microprocessors are typically small (i.e., significantly fewer memory locations than total number of pixels in the imager), external or non-embedded memory is required for the MPU to read and store image data from a frame of the imager in the memory. Code readers that use a microprocessing unit and non-embedded memory is both physically large and expensive, which are both problems for home appliances, as previously described, and, of course, for other IoT-enabled devices and any other device with a code reader whether or not IoT-enabled. As such, the inventor has appreciated a need for a code reader that is physically small and inexpensive.

BRIEF SUMMARY

A code reader inclusive of a microcontroller unit (MCU) having a microcontroller with an embedded memory that provides for a reduced physical size and cost as compared to a microprocessor-based code reader that uses external data storage memory. The embedded storage memory may allow for eliminating a separate, non-embedded storage memory and supporting electronics, while reducing footprint of the code reader. The embedded memory may have a lower storage capacity than the full image based on the number of pixels of the imager, but have sufficient memory cells to store a subsample or partial image data (i.e., a portion of a frame of image data) of the image data read from the imager to enable the microcontroller unit to decode machine-readable indicia in either a one-dimensional (1D) or two-dimensional (2D) format. The microcontroller may (i) read a subsample of the image data from the imager using row and/or column skipping, (ii) read portion a subsample of the image data from the imager (e.g., top third, middle third, bottom third), and/or otherwise.

One embodiment of a microcontroller-based code reader may include an imager configured to capture an image of an object having a machine-readable indicia disposed thereon. A microcontroller having an embedded memory therein, and configured to read, from the imager, an image subsample (i.e., partial image data) of an image captured by the imager, store the image subsample in the embedded memory of the microcontroller, and decode the machine-readable indicia from the image subsample.

One embodiment of a method of reading a machine-readable indicia may include capturing, by an imager, an image of a machine-readable indicia disposed an object. An image subsample of an image captured by the imager may be read from the imager. The image subsample may be stored in an embedded memory of a microcontroller in electrical communication with the imager. The machine-readable indicia may be decoded from the image subsample.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
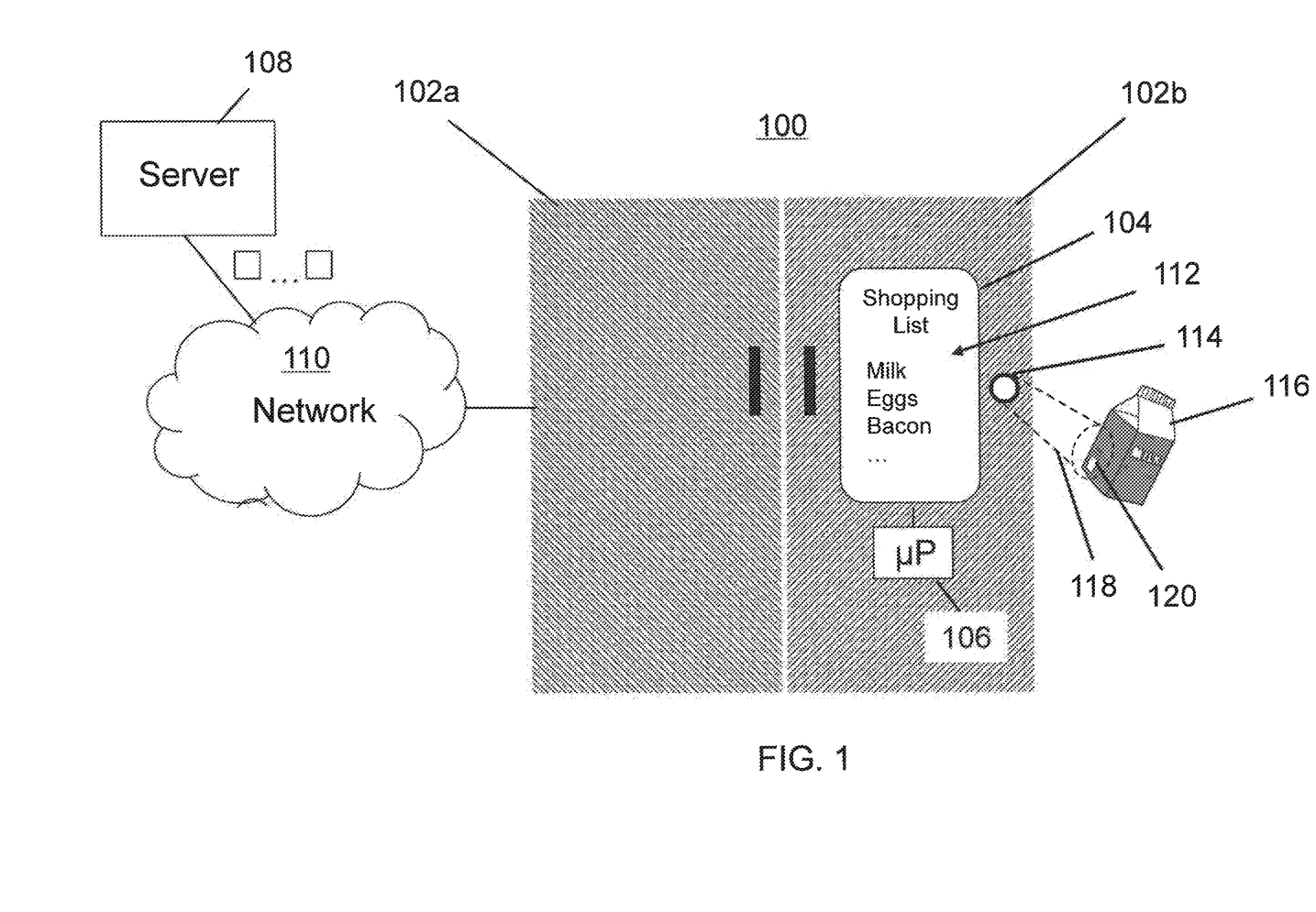
FIG. 1 is an illustration of an illustrative home appliance configured as an Internet of things (IoT)-based appliance, in this case an IoT-based refrigerator.

With regard to FIG. 1, an illustration of an illustrative home appliance 100 configured as an Internet of things (IoT)-based refrigerator is shown. While the appliance 100 is described herein in the context of a refrigerator, it should be understood that other appliances (e.g., microwaves, ovens, freezer, etc.) and devices are also contemplated and included as embodiments of the disclosure.

The appliance 100 includes a pair of doors 102a and 102b (collectively 102). Positioned on one of the doors 102b, a user interactive electronic display device 104 may be available for a user to utilize to perform a variety of functions that are made available locally and/or remotely. In being local, a local computer processor 106 may be configured to perform one or more functions, and in being remote, the appliance 100 may be in communication with the a server 108 via a network 110, wired and/or wireless, where the server 108 may be configured to perform one or more functions in conjunction with the appliance 100.

The electronic display 104 is shown to be displaying content 112, in this case on a content list, that tracks what food goods are in and/or remaining in the appliance 100 that the user may maintain using a code reader 114 positioned on the door 102b to read machine-readable indicia (e.g., barcodes) from consumer product packages and/or other sources (e.g., list of available consumer products on paper with associated machine-readable indicia). It should be understood that the position of the code reader 114 is illustrative, and that the code reader 114 may be positioned anywhere on, at, in, or otherwise in communication with the processor 106 of the appliance 100 to execute software to support any desired functionality of the manufacturer of the appliance 100 or third-party (e.g., grocery store, online retailer, etc.).

The code reader 114 may be an imaging code reader that captures images of machine-readable indicia using an imager, such as a VGA-sized imager that is sized with 640×480 pixels, as opposed to a scanning code reader as imaging code readers are generally more easily operated by consumers than scanning code readers. As understood in the art, VGA-sized imagers have a small number of pixels (e.g., 640×480 pixels) relative to other imagers, but have a sufficient number of pixels for capturing images of machine-readable indicia for low-performance and low-cost applications, such as home appliances. The code reader 114 may include optics, imager, and a microcontroller unit (MCU) inclusive of a microcontroller, an embedded data storage memory, and optionally other electronic components, as further described herein. As a result of having embedded memory, the MCU-based code reader 114 is able to have a smaller footprint and is more cost-effective than a microprocessing unit (MPU)-based code reader (e.g., larger footprint and half or less of the cost). As shown, a user may present a consumer package 116 within an imaging region 118 to enable the code reader 114 to image a machine-readable indicia 120 positioned on the consumer package 116. Thereafter, the code reader 114 may decode the machine-readable indicia 120 to determine an associated product, in this case milk, to add to the shopping list being displayed as content 112 on the electronic display 104. It should be understood that the appliance 100, whether IoT-enabled or not, may be any home or non-home appliance, as understood in the art.

Figure 2:
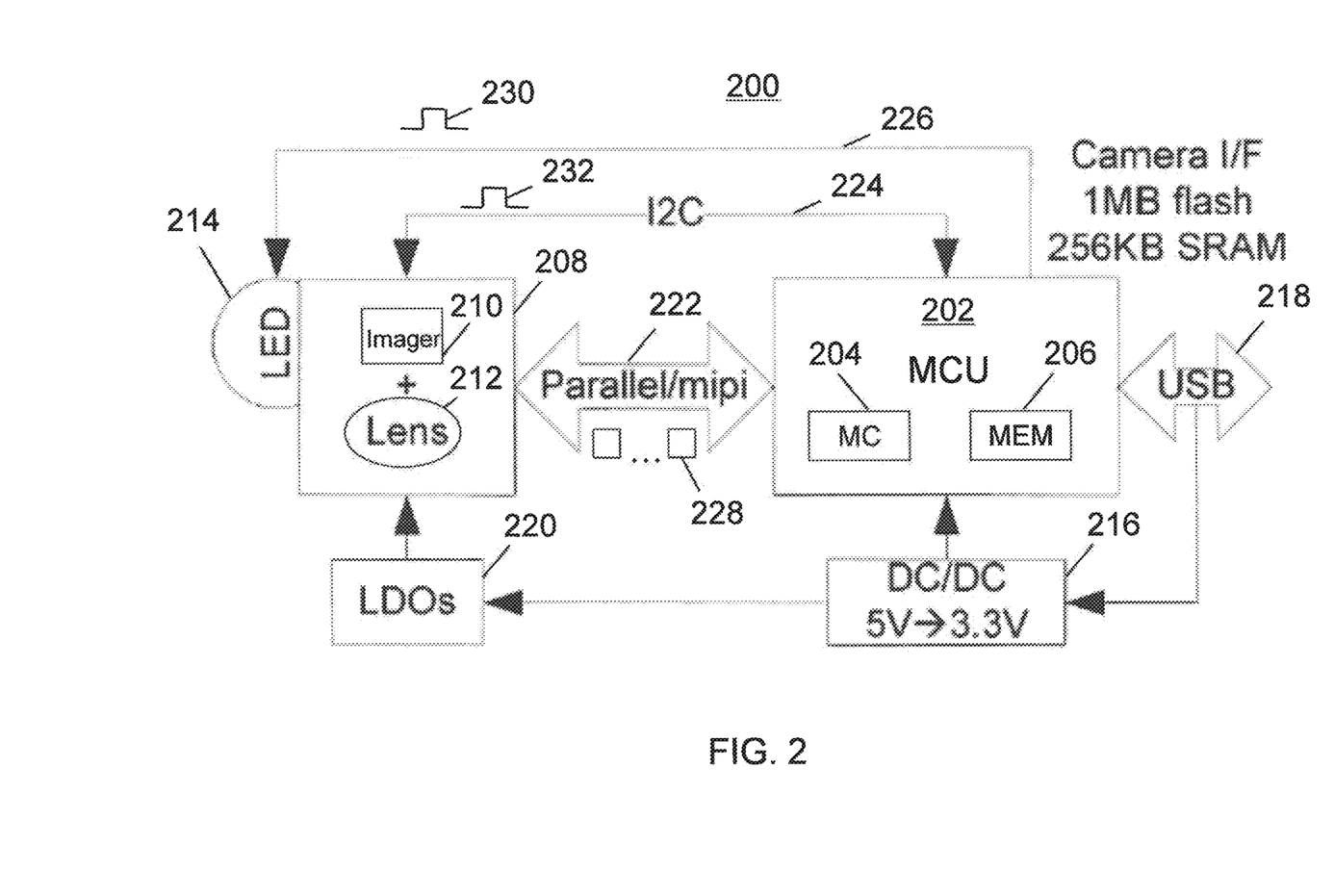
FIG. 2 is a block diagram of an illustrative microcontroller unit (MCU)-based code reader.

With regard to FIG. 2, a block diagram of an illustrative MCU-based code reader 200 is shown. The MCU-based code reader 200 includes a microcontroller unit 202 inclusive of a microcontroller 204 and non-transitory embedded memory 206. Microcontrollers are typically used to control motors and perform other low-end control tasks, as understood in the art, but because of the size of the embedded memory 206, reduced cost, and performance capabilities may be used to perform reading and decoding functions of machine-readable indicia or codes. The memory 206, which is often formed of two types of memories, including flash memory and SRAM memory. The memory 206 may be used to operate as an image buffer of image data for the microcontroller 204. Although shown as being separate, the microcontroller unit 202 may be alternatively represented with the memory 206 being disposed within the microcontroller 204. The microcontroller unit 202 may be configured with additional electronics, such as input/output (I/O) buffers, and be formed on a single chip and/or included within a single package.

While the embedded memories in MCUs generally have more memory elements than embedded memories in MPUs, the number of memory elements in the MCUs generally have fewer number of memory elements than the number of pixels of imagers. In an embodiment, the MCU 202 may be a GD32F207RGT6 including 1024 KB flash memory/256 KB SRAM by Gigadevice or STM32F207 series by STMicroelectronics. Other embedded memories may be smaller, such as 128 KB SRAM, or larger, such as 2048K8 flash memory/512 KB SRAM.

The MCU 202 may be in electrical communication with an imaging unit 208 inclusive of imager 210, such as a CMOS image sensor (CIS), and lens 212. In an alternative embodiment, the imaging unit 208 may include only the imager 210, and the lens 212 may be physically independent from the imager 210. The imaging unit 208 may additionally include a light emitting diode (LED) 214 configured to illuminate a scene being captured by the imager 210. In an alternative embodiment, the imaging unit 208 may not have the LED 214 integrated therewith, but rather the LED 214 may be separate from the imaging unit 208. The imaging unit 208 may include an imager or module OVM7692/7695, OV7251, OV01A10 by Omnivision or VGA reflowable module by Sunny Optical.

To power the MCU 202, a DC/DC converter 216 may be utilized and also be in electrical communication with a data bus 218, such as a USB data bus, to which the MCU 202 is also in electrical communication. The MCU 202 may communicate data over the data bus 218 to another device, such as a processor operating in an appliance in which the code reader 200 is disposed. The DC/DC converter 216 may be in electrical communication with one or more low dropout DC linear voltage regulator (LDOs) that are able to regulate voltage even when the supply voltage is close to the output voltage for powering the imager 210 and any other electronics, such as the LED 214.

In operation, the MCU 202 may communicate with the imaging unit 208 via a parallel or serial mobile industry processor interface (MIPI) data bus 222 and/or inter-integrated circuit (I2C) bus 224. The MCU 202 may further be in electrical communication with the LED 214 via power line 226 to control operation of the LED 214. The imager 210 may be an imager having 640×480 pixels, for example, and the memory 206 may have a memory capacity to store the image data for the full frame, but have sufficient memory capacity to store subsample image data 228 inclusive of at least a portion of an imaged machine-readable indicia captured by the imager 210, as further described herein. To collect the subsample image data 228, the microcontroller 204 may command the imager 210 with command signals 228 to control operation of the imager 210 and illumination control signal 230 to turn the LED 214 to an ON state and an OFF state. The command signals 228 may cause the imager 210 to output subsample image data 232 from specific rows and columns via the data bus 222. For the purpose of this application, subsampling an image may relate to reading any subset of an image frame from the imager 210, including reading a portion of an image frame from the imager 210 by (i) row skipping, (ii) column skipping, (iii) partial image reading a region-of-interest that is a subset of a full image.

Figure 3A:
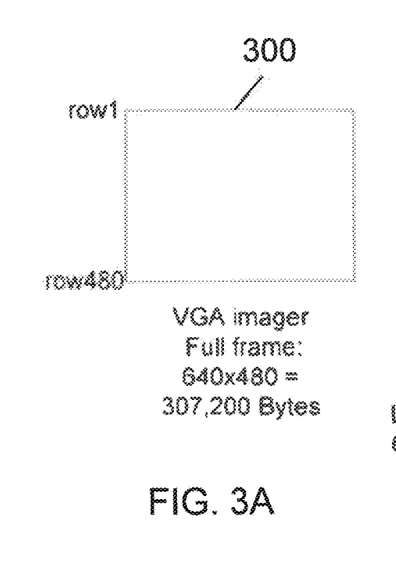
FIG. 3A is an illustration of an illustrative imager used by an MCU-based code reader.

With regard to FIG. 3A, an illustration of an illustrative imager 300 used by the MCU-based code reader 200 of FIG. 2 is shown. The imager 300 may be configured with 640 columns×480 rows of pixels, which is 307,200 bytes. In operation, the imager 300 may capture a frame image. However, because conventional microcontrollers, such as described with regard to FIG. 2, do not have as much storage capacity within the embedded memories as would be required for a full image frame based on the number of pixels as the imager 300, the full frame image cannot be stored in the embedded memory (e.g., memory 206) of the microcontroller (e.g., microcontroller 204). As such, rather than reading the entire frame of the imager 300 into the embedded memory of the microcontroller, a subsample of the image captured by the imager 300 may be read, as described with regard to FIGS. 3B-3E.

Figures 3B, 3C, 3D, 3E:
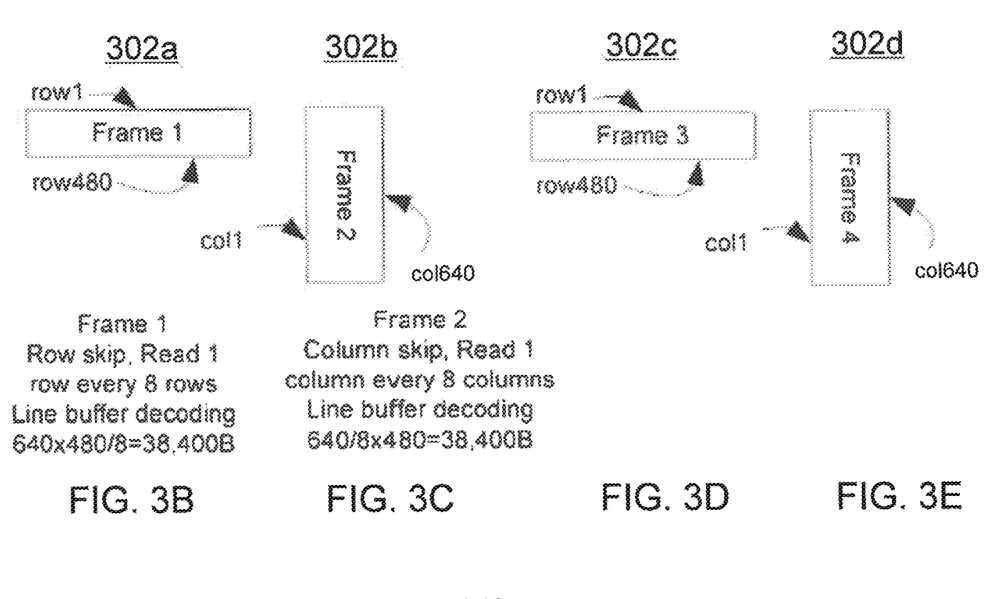
FIGS. 3B-3E are illustrations of repeated steps of a reading process of subsampling image data captured by the imager.

With regard to FIGS. 3B-3E, illustrations of steps 302a-302d (collectively 302) of an image subsampling process with subsampled image data captured by the imager 300 are shown. The steps 302 support 1D barcodes or other 1D machine-readable indicia. As shown, rather than reading the entire frame from the imager 300, row skipping may be performed in step 302a. Row skipping may be used to reduce the total number of image pixels that are read from the imager 300. For example, rather than reading all 480 rows, every other row may be skipped such that 240 rows are read. However, in applications in which objects in the scene being captured move relatively slowly, such as with the use of a presentation image scanner to image machine-readable indicia, the entire resolution or even half of the resolution of the number of pixels of the imager is unnecessary. Hence, it is possible to skip more than every other row, such as shown in FIG. 3B, where the image Frame 1 is formed by subsampling one of every eight rows (i.e., skipping 7 rows after reading image data from one row). Other subsampling techniques are also possible to use with the code reader. In an embodiment, the total number of columns are read with a row skipping process for ID codes.

In example shown in FIGS. 3B and 3C, Frame 1 includes 640×480/8=38,400 bytes or 38.4 KB and Frame 2 includes 640/8×480=38,400 bytes, which are significantly smaller than the embedded memory 206 of the MCU 202 that may have 1024 KB flash/256 KB SRAM memory sizes, for example, which allows for multiple subsamples to be captured in the embedded memory 206. In operation, the SRAM may be used to buffer the subsample of the image data read from the imager 300. In an embodiment, the SRAM is used as a single frame buffer and data for each new frame may overwrite the previous frame data. Frame 2 of FIG. 3C is formed by column skipping when reading the imager 300 in step 302b. In this case, the same reading technique may be used for reading the imager 300 as in step 302a, but rather than skipping rows, columns may be skipped and every row may be read, thereby creating Frame 2 with 640/8 columns× 480 rows=38,400 bytes. Steps 302c and 302d in FIGS. 3D and 3E, respectively, may be the same as respective steps 302a and 302b, but performed later in time than steps 302a and 302b. As the process continues, the microcontroller may decode the subsampled data in each of the Frames 1 and 2 to determine whether a 1D barcode is contained in either of the Frames 1 and 2. If, however, a portion of a 1D barcode is captured in a slanted manner such that the 1D barcode is only partially included in each of Frames 1 and 2, then a label stitching process may be performed to stitch label data together from each of the two Frames 1 and 2, thereby forming an entire label from decoded portions of the 1D barcode image. Any label stitching process may be utilized.

Figures 4A, 4B:
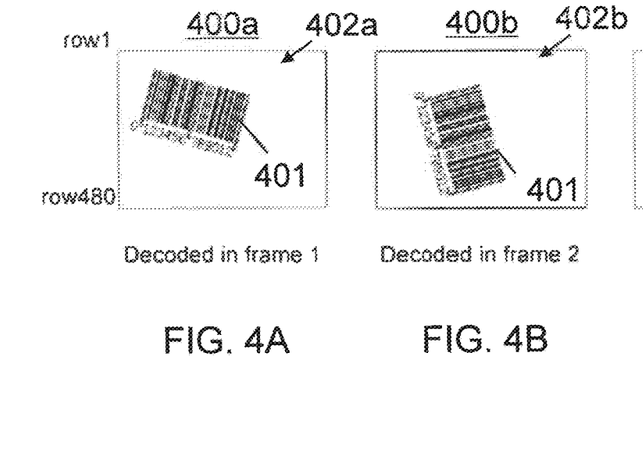
FIGS. 4A-4C are illustrations of illustrative images of a 1D barcode label at different rotational angles that are capable of being respectively decoded from subsampled image data in Frames 1 and 2 after being captured by an imager and read using subsampling into an embedded memory of a microcontroller unit.
Figure 4C:
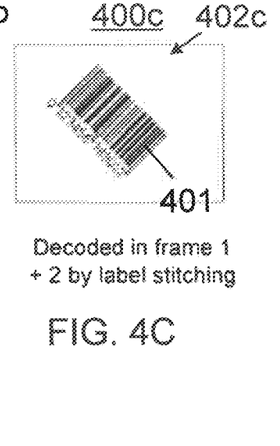

With regard to FIGS. 4A-4C, illustrations of illustrative images 400a-400c of a 1D barcode label 401 at different rotational angles that are capable of being respectively decoded from subsampled image data in Frames 1 and 2 (see FIGS. 3B and 3C), after being captured by an imager and read using subsampling into an embedded memory of a microcontroller unit are shown. The 1D barcode label 401 in the image data 402a is relatively horizontal so Frame 1 that includes a subsample of rows (e.g., read 1 row and skip the following 7 rows) and each of the columns has sufficient image data to enable decoding of the entire 1D barcode. The 1D barcode label 401 in the image data 402b is shown to be relatively vertical so Frame 2 that includes a subsample of columns (e.g., read 1 column and skip the following 7 columns) and each of the rows has sufficient image data to enable decoding of the entire 1D barcode. The 1D barcode label 401 in the image data 402c is shown to be diagonal so neither of Frames 1 or 2 contain an image of the entire 1D barcode. However, label stitching of decoded image data contained in Frames 1 and 2 may be performed to form contiguous image data of the 1D barcode label 401 to enable decoding of the entire diagonally-oriented 1D barcode. That is, a first portion of a label may be captured in Frame 1 that was formed by row skipping, and a second portion of the label may be captured in Frame 2 that was formed by column skipping. The complete label may thereafter be formed by label stitching partially decoded portions of the label from each of Frames 1 and 2.

Figure 5A:
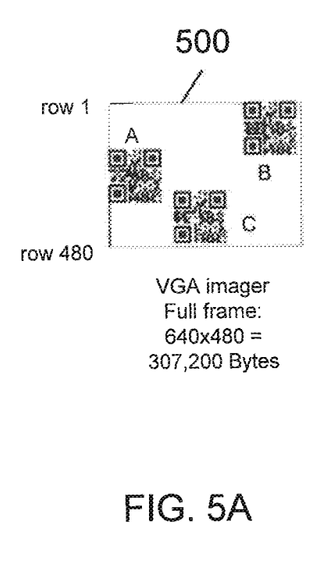
FIG. 5A is an illustration of an illustrative imager used by an MCU-based code reader.
Figure 5B:
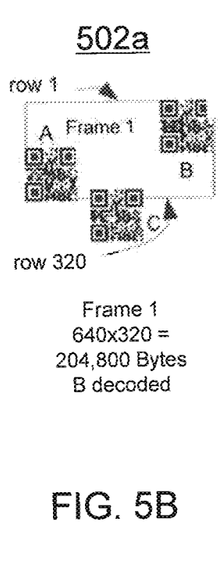
FIGS. 5B-5F are illustrative steps of a reading process of image data of 2D machine-readable indicia captured by the imager.
Figure 5C:
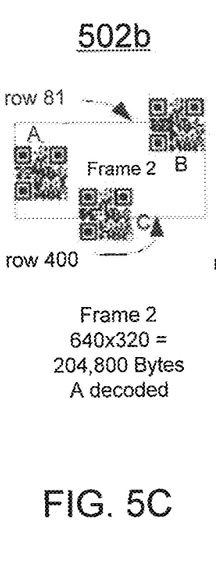
Figure 5D:
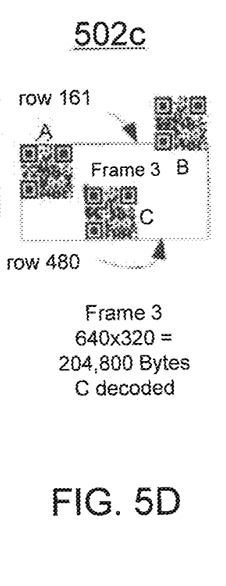
Figure 5E:
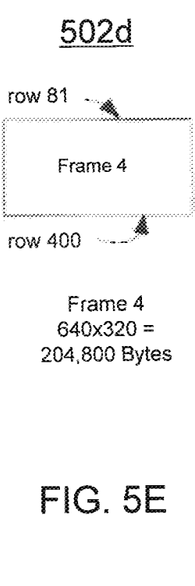
Figure 5F:
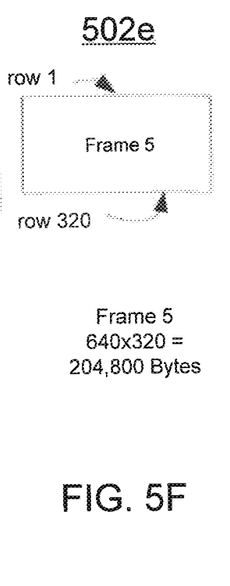

With regard to FIG. 5A, an illustration of an illustrative imager 500 used by the MCU-based code reader of FIG. 2 is shown. The imager 500 may be configured with 640 columns×480 rows of pixels. It should be understood that an alternatively sized imager may be utilized. In this case, 2D codes (e.g., QR codes) A, B, and C are imaged within a single, full frame of the imager 500. As previously described, because conventional microcontrollers do not have an embedded memory with at least the same number of memory elements as the number of pixels of the imager 500, the full frame image captured by the imager 500 cannot be stored in the embedded memory (e.g., memory 206) of the microcontroller unit (e.g., microcontroller unit 202). As such, rather than reading the entire frame into the memory of the microcontroller unit, partial image region-of-interest (ROI) of the image captured by the imager may be read, as described with regard to FIGS. 5B-5E.

With regard to FIGS. 5B-5F, illustrative steps 502a-502e (collectively 502) of a reading process for reading image data of 2D machine-readable indicia captured by the imager 500 are shown. The 2D machine-readable indicia or 2D codes have at least one dimension (e.g., length) that is typically smaller than the corresponding dimension of 1D codes. As such, one embodiment may include reading a portion of the full frame of 640×480 pixels captured by the imager 500. For example, two-thirds of the rows of the full frame may be captured in a sequence of steps 502a-502e such that Frame 1 (FIG. 5B) may include rows 1-320, Frame 2 (FIG. 5C) may include rows 81-400, Frame 3 (FIG. 5D) may include rows 161-480, Frame 4 (FIG. 5E) may include rows 81-400, and Frame 5 (FIG. 5F) may include rows 1-320. It is noted that (i) Frame 4 captures the same rows as Frame 2, and (ii) Frame 5 captures the same rows as Frame 1, but each at different points in time. In Frame 1, 2D codes A and B are fully contained such that each may be decoded therefrom. In Frame 2, 2D code A is fully contained such that 2D code A may be decoded therefrom. In Frame 3, 2D codes A and C are fully contained such that 2D codes A and C may be decoded therefrom. It is noted that the different sets of contiguous rows in FIGS. 5B-5F partially overlap in some sections. In some embodiments, the different sets of contiguous rows may not overlap, such as three contiguous sets of rows that each comprise a third of the possible rows of the full image frame (e.g., Frame 1 includes rows 1-160, Frame 2 includes rows 161-320, and Frame 3 includes rows 321-480). Other arrangements and combinations are also contemplated for reading contiguous rows and/or contiguous columns.

The steps 502a-502e may be continuously cycled to continuously scan for 2D codes contained within the full frame of the imager 500. It is possible to further subsample or read a partial set of image data by skipping rows and columns, optionally simultaneously, when reading from the imager 500 (e.g., skip every other row and every other column). It should be understood that rather than subsampling by rows, subsampling by columns may alternatively be performed. In one embodiment, the imager 500 may be configured for 2 pixels per element so that a 40×40 pixel area is needed to capture a 20×20 element 2D code. In an embodiment, 20-30 frames per second may be processed by the microcontroller, which is sufficient for consumer-type applications and low-speed commercial-type applications for which the code reader described herein are to be utilized.

Because the code reader may be used to read 1D and 2D codes, the code reader may be configured (i) to enable a user to select via a user interface, for example, the type of code to be read or (ii) to automatically successively image scan for both 1D and 2D codes. For example, steps 302a-302d and 502a-502e may be performed for each full frame captured by an imager in interleaved order (e.g., first steps 302a-302d, then steps 502a-502e, then steps 302a-302d, etc.). That is, the code reader may continuously scan for either type of code automatically and then output decoded information from the decoded code(s) when one or the other or both types of codes are identified within a subsampled image frame.

Figures 6A, 6B:
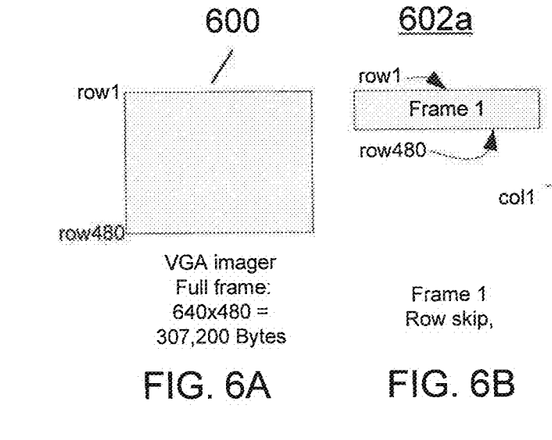
FIG. 6A is an illustration of an illustrative imager used by an MCU-based code reader.
FIGS. 6B-6F are illustrative steps of a reading process of subsampling image data captured by the imager.

With regard to FIG. 6A, an illustration of an illustrative imager used by an MCU-based code reader 600 is shown. The imager 600 may be any imager, such as a VGA imager, as previously described.

Figure 6C:
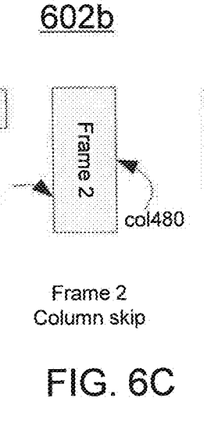
Figure 6D:
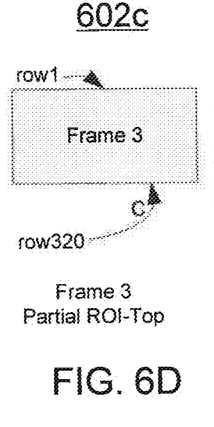
Figure 6E:
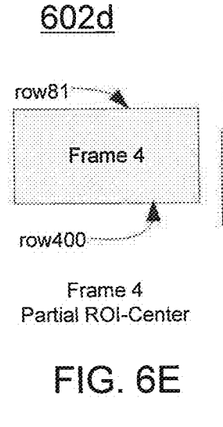
Figure 6F:
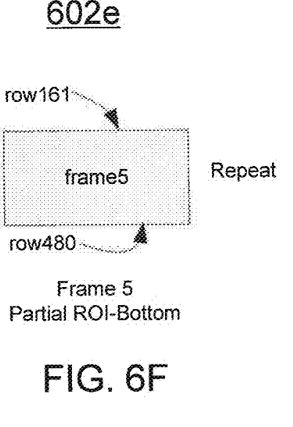

With regard to FIGS. 6B-6F, illustrative steps 602a-602e (collectively 602) of a reading process of subsampling image data captured by the imager are shown. In this reading process, successive 1D and 2D reading processes are used such that the code reader is capable of reading either or both 1D and 2D machine-readable indicia. FIGS. 6B and 6C correspond to the process for reading 1D machine-readable indicia using subsampling described in FIGS. 3B and 3C, where Frame 1 is a subsampling using row skipping of the image data from the imager 600, and Frame 2 is a subsampling using column skipping of the image data of from the imager 600. FIGS. 6D-6F correspond to the process for reading 2D machine-readable indicia using subsampling described in FIGS. 5B-5D, where Frame 3 is a subsampling (i.e., partial image data or ROI of the image) of the first-third of the rows of the pixels of the imager 600, Frame 4 is a subsampling of the second-third of the rows of the pixels of the imager 600, and Frame 5 is a subsampling of the third-third of the rows of the pixels of the imager 600.

Figure 7:
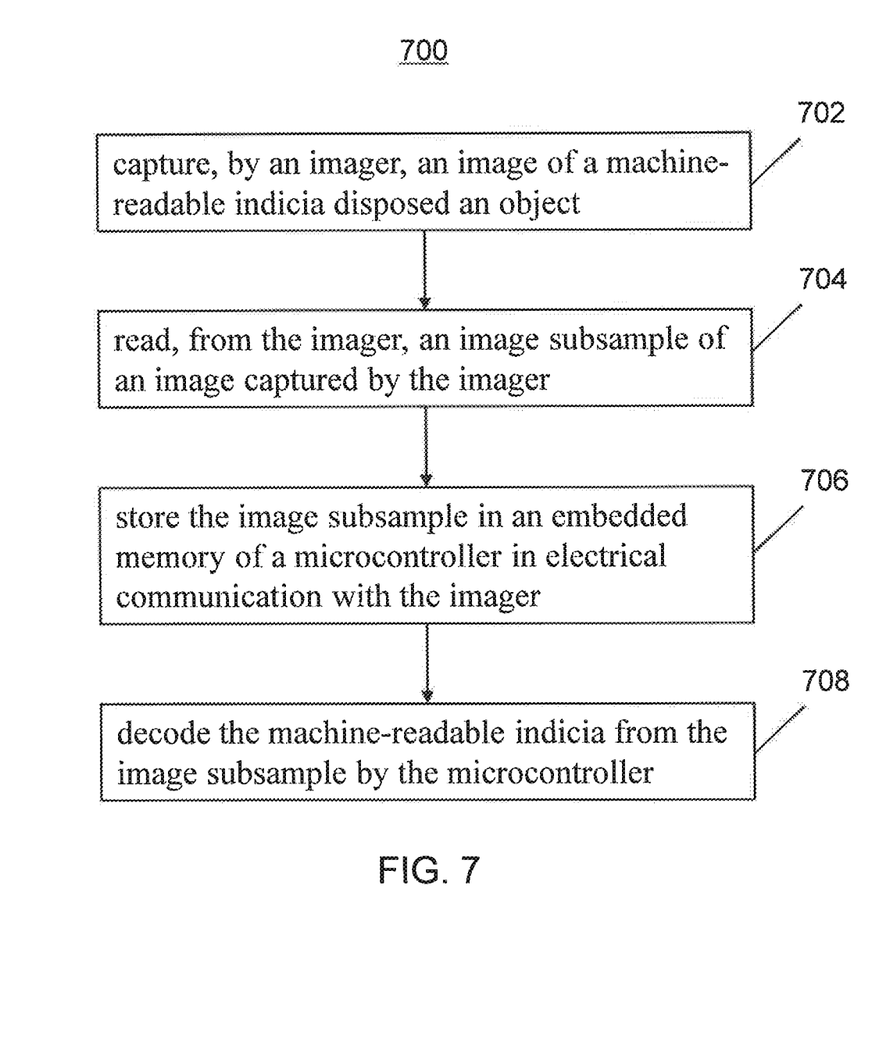
FIG. 7 is a flow diagram of an illustrative process for reading and decoding a machine-readable indicia by a microcontroller-based code reader.

With regard to FIG. 7, a flow diagram of an illustrative process 700 for reading and decoding a machine-readable indicia by a microcontroller-based code reader is shown. The process 700 may start at step 702, where an image of a machine-readable indicia disposed on an object may be captured by an imager. The imager may be a CMOS imager, such as a VGA imager with a full frame of 640×480 pixels. Other imager types and sizes may alternatively be utilized. At step 704, an image subsample of an image captured by the imager may be read. In reading the image subsample, the microcontroller may request specific rows and columns of the imager from which to read image data. For example, a command or set of commands to read every $8^{th}$ row and every column may be communicated from the microcontroller to the imager. Other subsampling reading commands (e.g., skip every other row; read successive first-third, second-third, third-third of the rows; etc.) may be performed, as well. At step 706, the image subsample read from the imager may be stored in an embedded memory of the microcontroller. At step 708, the machine-readable indicia from the image subsample may be decoded by the microcontroller. It should be understood that the microcontroller may decode multiple machine-readable indicia, such as 2D codes, contained in a single subsampled image frame.

Capturing, by the imager, may include capturing by an imager having a maximum number of pixels, the embedded memory having a maximum storage capacity less than an image having the maximum number of pixels. For example, the maximum number of pixels may be 640×480. In some embodiments, 1 pixel may be 1 Byte of data, but other sizes are also contemplated (e.g., 1 pixel=10 bits, 1 pixel=12 bits, etc.) In an embodiment, the process may include repeatedly reading an image subsample or partial set of image data from the imager, and in response to identifying at least a portion of a machine-readable indicia, the machine-readable indicia may be stored and decoded. In reading an image subsample, a horizontal image subsample may be read in a first frame and a vertical image subsample may be read in a second frame.

Reading the image subsample may include row skipping when image subsampling in the first frame and column skipping when image subsampling in the second frame. Decoding the machine-readable indicia may include (i) determining whether the entire machine-readable indicia is contained within either of the horizontal image subsample in the first frame or the vertical image subsample in the second frame, and (ii) in response to determining that the entire machine-readable indicia is not contained in either of the horizontal or vertical image subsample, partial decoded label portions of the imaged machine-readable indicia contained in the horizontal and vertical image subsamples may be label stitched together to form the full label or code of the imaged machine-readable indicia.

Reading an image subsample may include (i) reading, from the imager, a sequence of image subsamples or partial images, where each of the image subsamples include different sets of contiguous rows of the image captured by the imager, and (ii) decoding one or more machine-readable indicia contained in each of the image subsamples. Reading the sequence of image subsamples may include reading a top set of contiguous rows, a middle set of contiguous rows, and a bottom set of contiguous rows. Reading the sequence of image subsamples may include successively cycling through the top-third, middle-third, bottom-third, middle-third, and top-third contiguous rows of the image frame or some other set of contiguous rows or columns that may or may not overlap in some sections. In an embodiment, 1D and 2D machine-readable indicia may be successively alternately read by the code reader. Data represented by the decoded machine-readable indicia may be communicated to a microprocessor of a host system in which the microcontroller-based code reader is operating.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A microcontroller-based code reader, comprising:
an imager configured to capture an image of an object having a machine-readable indicia disposed thereon;
a microcontroller having an embedded memory therein on a single chip, and configured to:
read directly from the imager;
form an image subsample of the image captured by the imager and read directly therefrom by skipping rows or columns of the imager, the image subsample being less than a full frame image of the imager;
store the image subsample in the embedded memory of the microcontroller without first storing the image subsample in any buffer external to the microcontroller; and
decode the machine-readable indicia from the image subsample.

2. The code reader according to claim 1, wherein the embedded memory has a storage capacity that is less than a full frame image of the imager.

3. The code reader according to claim 1, wherein the image subsample includes a first frame and a second frame.

4. The code reader according to claim 3, wherein the microcontroller is further configured to:
store the first frame in the embedded memory of the microcontroller;
attempt to decode the machine-readable indicia from the first frame;
store the second frame in the embedded memory of the microcontroller by overwriting the first frame; and
attempt to decode the machine-readable indicia from the second frame.

5. The code reader according to claim 4, wherein the microcontroller, in reading the image subsample, is configured to row skip when image subsampling in the first frame directly from the imager to the embedded memory of the microcontroller and column skip when image sub sampling in the second frame directly from the imager to the embedded memory of the microcontroller.

6. The code reader according to claim 5, wherein the microcontroller, in decoding the machine-readable indicia, is further configured to:
- determine whether the entire machine-readable indicia is contained within either of the first frame or the second frame; and
- in response to determining that the entire machine-readable indicia is not contained in either of the horizontal or vertical image subsample, stitch partially decoded label portions of the imaged machine-readable indicia contained in the first frame and the second frame to obtain a full decode of the machine-readable indicia.

7. The code reader according to claim 1, wherein the microcontroller, in reading an image subsample, is further configured to:
- read, directly from the imager to the embedded memory of the microcontroller, a sequence of image subsamples, each of the image subsamples including different sets of contiguous rows of the image captured by the imager; and
- decode one or more machine-readable indicia contained in each of the image subsamples.

8. The code reader according to claim 7, wherein the microcontroller, in reading the sequence of image subsamples, is configured to read directly from the imager to the embedded memory of the microcontroller a top set of contiguous rows, a middle set of contiguous rows, and a bottom set of contiguous rows of the image data.

9. The code reader according to claim 1, wherein the image subsample includes:
- a first frame with a row skipped subsample for 1D decoding by the microcontroller;
- a second frame with a column skipped subsample for 1D decoding by the microcontroller;
- a third frame with a first set of contiguous rows or columns for 2D decoding by the microcontroller; and
- a fourth frame with a second set of contiguous rows or columns for 2D decoding by the microcontroller.

10. The code reader according to claim 1, wherein the microcontroller is further configured to successively alternate read 1D and 2D machine-readable indicia.

11. A method of reading a machine-readable indicia, comprising:
- capturing, by an imager, an image of a machine-readable indicia disposed on an object;
- reading, directly from the imager by a microcontroller having an embedded memory on a single chip
- forming an image subsample of the image captured by the imager and read directly therefrom by skipping rows or columns of the imager, the image subsample being less than a full frame image of the imager;
- storing the image subsample in the embedded memory of the microcontroller in electrical communication with the imager without first storing in any buffer external to the microcontroller; and
- decoding the machine-readable indicia from the image subsample.

12. The method according to claim 11, wherein capturing, by an imager, includes capturing by an imager having a maximum number of pixels, the embedded memory having a maximum storage capacity less than an image having the maximum number of pixels.

13. The method according to claim 11, further comprising repeatedly reading image subsamples directly from the imager to the embedded memory of the microcontroller, and in response to identifying at least a portion of a machine-readable indicia, storing and decoding the machine-readable indicia.

14. The method according to claim 11, wherein reading an image subsample includes reading a horizontal image subsample in a first frame and a vertical image subsample in a second frame directly from the imager by the microcontroller without first storing in any buffer external to the microcontroller.

15. The method according to claim 14, wherein reading the image subsample includes the microcontroller row skipping when image subsampling in the first frame and column skipping when image sub sampling in the second frame during the direct reading from the imager that is then stored in the embedded memory of the microcontroller.

16. The method according to claim 15, wherein decoding the machine-readable indicia includes:
- determining whether the entire machine-readable indicia is contained within either of the horizontal image subsample in the first frame or the vertical image subsample in the second frame; and
- in response to determining that the entire machine-readable indicia is not contained in either of the horizontal or vertical image subsample, stitching decoded label portions of the imaged machine-readable indicia contained in the horizontal and vertical image subsamples.

17. The method according to claim 11, wherein reading an image sub sample includes:
- reading, directly from the imager to the embedded memory of the microcontroller, a sequence of image sub samples, each of the image sub samples including different sets of contiguous rows or columns of the image captured by the imager; and
- decoding one or more machine-readable indicia contained in each of the image subsamples.

18. The method according to claim 17, wherein reading the sequence of image subsamples includes reading a top set of contiguous rows, a middle set of contiguous rows, and a bottom set of contiguous rows of the image directly from the imager to the embedded memory of the microcontroller.

19. A device comprising:
- a system processor;
- a microcontroller-based code reader, comprising:
  - an imager configured to capture an image of an object having a machine-readable indicia disposed thereon; and
  - a microcontroller having an embedded memory therein on a single chip, and configured to:
    - read directly from the imager;
    - form an image subsample of the image captured by the imager and read directly therefrom by skipping rows or columns of the imager, the image subsample being less than a full frame image of the imager;
    - store the image subsample in the embedded memory of the microcontroller without first storing the image or the image sample in an external buffer;
    - decode the machine-readable indicia from the image subsample; and
    - communicate a decoding result to the system processor for executing an operation in response thereto.

20. The device according to claim 19, wherein the device is a home appliance.

* * * * *